United States Patent [19]

Lu et al.

[11] Patent Number: 5,773,788

[45] Date of Patent: Jun. 30, 1998

[54] GAS MIXTURES FOR PLASMA ARC TORCH CUTTING AND MARKING SYSTEMS

[75] Inventors: Zhipeng Lu, Hanover; Elizabeth B. Hackett, Lebanon, both of N.H.

[73] Assignee: Hypertherm, Inc., Hanover, N.H.

[21] Appl. No.: 707,247

[22] Filed: Sep. 3, 1996

[51] Int. Cl.$^6$ .................................................. B23K 10/00
[52] U.S. Cl. .............................. 219/121.59; 219/121.41; 219/121.56; 219/121.55
[58] Field of Search .................. 219/121.39, 121.44, 219/121, 59, 121.51, 121.54, 121.55, 74, 75

[56] References Cited

U.S. PATENT DOCUMENTS

| | | | |
|---|---|---|---|
| 2,907,863 | 10/1959 | Stanchus | 219/75 |
| 3,691,551 | 9/1972 | Dobbs et al. | 219/75 |
| 4,295,030 | 10/1981 | Hosoda et al. | 219/121.39 |
| 4,803,405 | 2/1989 | Nakano et al. | 315/111.21 |
| 4,977,305 | 12/1990 | Severance, Jr. | 219/121.39 |
| 5,070,227 | 12/1991 | Luo et al. | 219/121.55 |
| 5,166,494 | 11/1992 | Luo et al. | 219/121.55 |
| 5,317,126 | 5/1994 | Couch, Jr. et al. | 219/121.51 |
| 5,380,976 | 1/1995 | Couch, Jr. et al. | 219/121.44 |
| 5,396,043 | 3/1995 | Couch, Jr. et al. | 219/121.5 |
| 5,414,236 | 5/1995 | Couch, Jr. et al. | 219/121.39 |

*Primary Examiner*—Mark H. Paschall
*Attorney, Agent, or Firm*—Testa, Hurwitz & Thibeault, LLP

[57] ABSTRACT

A method of operating a plasma arc torch for marking a metallic workpiece spaced a stand-off distance from the torch utilizes a torch that includes a body, an electrode, and a nozzle mounted in the body so as to define a plasma chamber. The nozzle has a central passage and an exit orifice through which the transferred arc passes to the workpiece. The method also utilizes a plasma gas flow through the body to form a pilot arc in the plasma chamber and then to form a transferred arc between the electrode and the workpiece. The method includes forming the plasma gas flow with a selected mixture of hydrogen and an inert gas. The percentage of hydrogen in the selected mixture is between 0% and 35%. The percentage of inert gas in the selected mixture is between 100% and 65%. The inert gas may be argon.

13 Claims, 6 Drawing Sheets

| ARC CURRENT (A) | ARC VOLTAGE (V) | PLASMA PRESSURE (psi)(bar) | | SHIELD PRESSURE (psi)(bar) | | TORCH-TO-WORK DISTANCE (In)(mm) | | TRAVEL SPEED (ipm)(m/min) | | WIDTH (in) (mm) | | DEPTH (in) (mm) | | APPLICATION |
|---|---|---|---|---|---|---|---|---|---|---|---|---|---|---|
| 8 | 69 | 70 | 4.8 | 60 | 4.1 | 0.08 | 2 | 150 | 3.81 | 0.04 | 1 | ≤0.001 | ≤0.03 | LIGHT SCORING |
| 10 | 69 | 70 | 4.8 | 60 | 4.1 | 0.08 | 2 | 250 | 6.35 | 0.04 | 1 | ≤0.001 | ≤0.03 | LIGHT SCORING |
| 13 | 67 | 70 | 4.8 | 60 | 4.1 | 0.08 | 2 | 150 | 3.81 | 0.06 | 1.5 | 0.003 | 0.08 | HEAVY SCORING |
| 15 | 66 | 70 | 4.8 | 60 | 4.1 | 0.08 | 2 | 250 | 6.35 | 0.06 | 1.5 | 0.003 | 0.08 | HEAVY SCORING |
| 10 | N/A | 70 | 4.8 | 60 | 4.1 | 0.08 | 2 | N/A | N/A | N/A | N/A | 0.02 | 0.5 | DIMPLING |

FIG. 4

| ARC CURRENT (A) | ARC VOLTAGE (V) | PLASMA PRESSURE (psi)(bar) | | SHIELD PRESSURE (psi)(bar) | | TORCH-TO-WORK DISTANCE (In)(mm) | | TRAVEL SPEED (ipm)(m/min) | | WIDTH (in) (mm) | | DEPTH (in) (mm) | | APPLICATION |
|---|---|---|---|---|---|---|---|---|---|---|---|---|---|---|
| 6 | 72 | 70 | 4.8 | 60 | 4.1 | 0.08 | 2 | 150 | 3.81 | 0.03 | 0.76 | ≤0.001 | ≤0.03 | LIGHT SCORING |
| 8 | 69 | 70 | 4.8 | 60 | 4.1 | 0.08 | 2 | 250 | 6.35 | 0.03 | 0.76 | ≤0.001 | ≤0.03 | LIGHT SCORING |
| 9 | 69 | 70 | 4.8 | 60 | 4.1 | 0.08 | 2 | 150 | 3.81 | 0.04 | 1 | 0.005 | 0.13 | HEAVY SCORING |
| 11 | 68 | 70 | 4.8 | 60 | 4.1 | 0.08 | 2 | 250 | 6.35 | 0.04 | 1 | 0.005 | 0.13 | HEAVY SCORING |
| 8 | N/A | 70 | 4.8 | 60 | 4.1 | 0.08 | 2 | N/A | N/A | N/A | N/A | 0.02 | 0.5 | DIMPLING |

FIG. 5

| ARC CURRENT (A) | ARC VOLTAGE (V) | PLASMA PRESSURE (psi)(bar) | | SHIELD PRESSURE (psi)(bar) | | TORCH-TO-WORK DISTANCE (In)(mm) | | TRAVEL SPEED (ipm)(m/min) | | WIDTH (in) (mm) | | DEPTH (in) (mm) | | MATERIAL |
|---|---|---|---|---|---|---|---|---|---|---|---|---|---|---|
| 10 | 69 | 70 | 4.8 | 60 | 4.1 | 0.08 | 2 | 150 | 3.81 | 0.03 | 0.8 | 0.002 | 0.05 | ALUMINUM |

FIG. 6

GAS MIXTURES FOR PLASMA ARC TORCH CUTTING AND MARKING SYSTEMS

FIELD OF THE INVENTION

The invention relates generally to the field of plasma arc cutting and marking systems and processes. In particular, the invention relates to the use of argon and hydrogen gas mixtures in plasma arc cutting and marking systems and processes.

BACKGROUND OF THE INVENTION

Plasma arc torches are widely used in the cutting of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). The pilot arc ionizes gas passing through the nozzle exit orifice. After the ionized gas reduces the electrical resistance between the electrode and the workpiece, the arc transfers from the nozzle to the workpiece. The torch is operated in this transferred plasma arc mode, which is characterized by the conductive flow of ionized gas from the electrode to the workpiece, for the cutting of the workpiece.

Generally, there are two widely used techniques for generating a plasma arc. One technique uses a high frequency, high voltage (HFHV) signal coupled to a DC power supply and the torch. The HFHV signal is typically provided by a generator associated with the power supply. The HFHV signal induces a spark discharge in the plasma gas flowing between the electrode and a nozzle, and this discharge provides a current path. The pilot arc is thus formed between the electrode and the nozzle with the voltage existing across them.

The other technique for generating a plasma arc is known as contact starting. Contact starting is advantageous because it does not require high frequency equipment and, therefore, is less expensive and does not generate electromagnetic interference. In one form of contact starting, the electrode is manually placed into electrical connection with the workpiece. A current is then passed from the electrode to the workpiece and the arc is struck by manually backing the cathode away from the workpiece. Another form of contact starting can be found in U.S. Pat. Nos. 4,791,268 and 4,902,871, assigned to Hypertherm, Inc., which are incorporated herein by reference. A movable electrode and a stationary nozzle are initially in contact due to a spring coupled to the electrode such that the nozzle orifice is blocked. To start the torch, a current is passed from the electrode to the nozzle and a plasma gas is supplied to a plasma chamber defined by the electrode, the nozzle and the swirl ring. Contact starting is achieved when the buildup of gas pressure in the plasma chamber overcomes the spring force, thereby separating the electrode from the nozzle and drawing a pilot arc therebetween.

Conventional plasma arc torches come in various types (e.g. hand held, mechanized). Typically such plasma arc torches are used for piercing and cutting metallic workpieces (e.g. mild steel, stainless steel and aluminum).

Known plasma arc torches are generally inappropriate for marking applications because they utilize a relatively high current arc which lacks the necessary precision and appropriate power level to be useful for marking purposes. There is currently a need in the industry for a precision plasma arc torch system for marking applications.

SUMMARY OF THE INVENTION

It is therefore a principal object of this invention to provide a plasma arc torch and method of using a plasma arc torch for marking applications. It is another principle object of this invention to utilize a plasma gas comprising a mixture of argon and hydrogen for marking applications.

Plasma marking is achieved by generating a clearly visible mark on a metallic surface utilizing a plasma arc having carefully controlled energy. The mark can be temporary or permanent. A temporary mark is achieved by heat induced discoloration of the surface. The metallic surface is not melted with temporary marking. Thus, temporary marking is lost during secondary operations such as plating or sand-blasting. A permanent mark or score is achieved by melting and resolidifing the metallic surface along the mark. A permanent mark can be light (shallow, grooved and narrow) or heavy (deep and wide) depending on the application. Permanent marks are still visible after secondary operations such as plating, painting or sand-blasting. Dimpling or punching can also be achieved by applying a stationary plasma arc torch to a workpiece for a predetermined time period. Plasma dimpling or punching is also desired in some applications.

A principal discovery of the present invention is that a low current plasma arc torch utilizing a particular gas flow is well suited for marking applications. Accordingly, the present invention features a method of operating a plasma arc torch for marking a metallic workpiece spaced a distance from the torch. The method utilizes a torch that includes a body, an electrode, and a nozzle mounted in the body so as to define a plasma chamber. The nozzle has a central passage and an exit orifice through which the transferred arc passes to the workpiece. The method also utilizes a plasma gas flow through the body to form a pilot arc in the plasma chamber and then to form a transferred arc between the electrode and the workpiece. The method includes forming the plasma gas flow with a selected mixture of hydrogen and an inert gas. The percentage of hydrogen in the selected mixture is between 0% and 35%. The percentage of inert gas in the selected mixture is between 100% and 65%. The inert gas may be argon. The selected mixture may be approximately 5% hydrogen and 95% inert gas.

The method may include adjusting the distance between the torch and the workpiece, commonly referred to as the stand-off distance, based on the percentage of hydrogen in the selected mixture. The stand-off distance is adjusted in an inverse proportional relationship to the percentage of hydrogen in the selected mixture.

The method may also include adjusting an operating current of the torch based on the percentage of hydrogen in the selected mixture. The operating current is adjusted in an inverse proportional relationship to the percentage of hydrogen in the selected mixture. The operating current may be adjusted to a value between 4 and 19 amperes depending on the percentage of hydrogen in the selected mixture.

The present invention also features a method for marking a metallic workpiece with a plasma arc torch spaced a distance from the torch. The method utilizes a torch that includes a body, an electrode, and a nozzle having a central passage and an exit orifice mounted in the body in the body. The method also utilizes a plasma gas flow through the body.

The method includes forming the plasma gas flow with a selected mixture of hydrogen and an inert gas. The percentage of hydrogen in the selected mixture is between 0% and 35%. The percentage of inert gas in the selected mixture is between 100% and 65%. The inert gas may be argon. The selected mixture may be approximately 5% hydrogen and 95% inert gas.

The method also includes generating a pilot arc between the electrode and the nozzle by ionizing the plasma gas flow. In addition, the method includes causing transfer of the pilot arc from the nozzle to the workpiece to form a transferred arc between the electrode and the workpiece. Also, the method includes moving the torch relative to the workpiece.

The method may include adjusting the stand-off distance between the torch and the workpiece based on the percentage of hydrogen in the selected mixture. The stand-off distance may be adjusted in an inverse proportional relationship to the percentage of hydrogen in the selected mixture.

The method may also include adjusting an operating current of the torch based on the percentage of hydrogen in the selected mixture. The operating current may be adjusted in an inverse proportional relationship to the percentage of hydrogen in the selected mixture. The operating current may be adjusted to a value between 4 and 19 amperes depending on the percentage of hydrogen in the selected mixture.

The present invention also features a method of operating a plasma arc torch for cutting or marking a metallic workpiece spaced a distance from the torch. The method utilizes a torch that includes a body, an electrode, and a nozzle mounted in the body so as to define a plasma chamber. The nozzle has a central passage and an exit orifice through which the transferred arc passes to the workpiece. The method also utilizes a plasma gas flow through the body to form a pilot arc in the plasma chamber and then to form a transferred arc between the electrode and the workpiece. The method includes forming the plasma gas flow with a selected mixture of hydrogen and an inert gas. The percentage of hydrogen in the selected mixture is between about 5% and 20%. The percentage of inert gas in the selected mixture is between is between about 95% and 80%. The inert gas may be argon. The selected mixture may be approximately 5% hydrogen and 95% inert gas.

The method may include adjusting the stand-off distance between the torch and the workpiece based on the percentage of hydrogen in the selected mixture. The stand-off distance may be adjusted in an inverse proportional relationship to the percentage of hydrogen in the selected mixture.

The method may also include adjusting an operating current of the torch based on the percentage of hydrogen in the selected mixture. The operating current may be adjusted in an inverse proportional relationship to the percentage of hydrogen in the selected mixture. The operating current may be adjusted to a value between 4 and 19 amperes depending on the percentage of hydrogen in the selected mixture.

The present invention also features a plasma arc torch system for marking a metallic workpiece spaced a distance from the torch. The torch system includes a torch body, a power supply electrically and fluid dynamically coupled to the body, an electrode, and a nozzle mounted in the body so as to define a plasma chamber. The nozzle has a central passage and an exit orifice through which a transferred arc passes to the workpiece.

The torch system also includes a plasma gas source comprising hydrogen and an inert gas. The plasma gas flows through the body and forms a pilot arc in the plasma chamber when power is applied from the power supply and eventually forms a transferred arc between the electrode and the workpiece. The percentage of hydrogen in the plasma gas is between 0% and 35%. The percentage of inert gas in the selected mixture is between 100% and 65%. The inert gas may be argon.

BRIEF DESCRIPTION OF THE DRAWINGS

This invention is described with particularity in the appended claims. The above and further advantages of this invention may be better understood by referring to the following description taken in conjunction with the accompanying drawings, in which:

FIG. 4 illustrates an example of operating data of a system for marking mild steel that embodies the invention.

FIG. 5 illustrates an example of operating data of a system for marking stainless steel that embodies the invention.

FIG. 6 illustrates an example of operating data of a system for marking aluminum that embodies the invention.

DETAILED DESCRIPTION OF THE INVENTION

Figure 1:
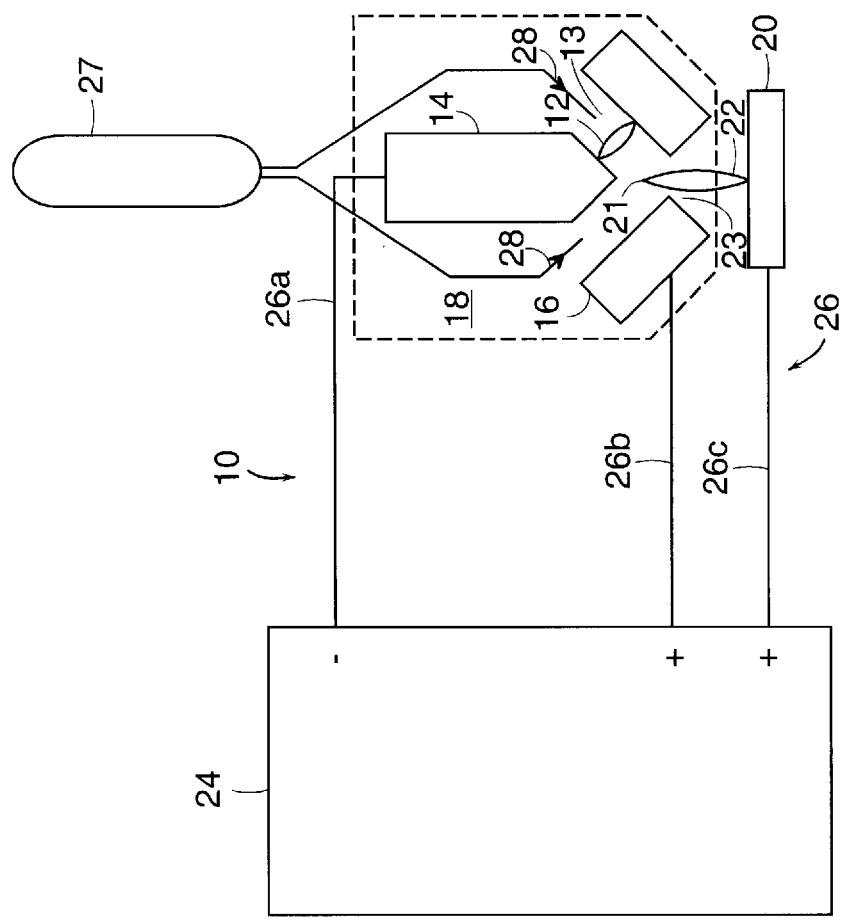
FIG. 1 illustrates a plasma arc torch that can be utilized to practice the invention.

FIG. 1 illustrates a plasma arc torch 10 that can be utilized to practice the invention. A pilot arc 12 is first established in a plasma chamber 13 between an electrode 14 and a nozzle 16 of a plasma arc torch body 18 by utilizing a starting technique such as high frequency high voltage (HFHV) ignition or contact start ignition. The nozzle 16 has a central passage 21 and an exit orifice 23 through which an arc can transfer to a workpiece 20.

The pilot arc 12 transfers to the workpiece 20 as a transferred arc 22. The transferred arc 22 has a higher current level than the pilot arc 12 and therefore can conduct significantly more energy to the metal workpiece 20 than the pilot arc 12. The energy in the transferred arc 22 can be utilized for marking or for cutting applications.

A power supply 23 provides the electrical energy for the pilot arc and transferred arc operation. An electrical lead set 26 has a negative lead 26a connected from the negative output terminal of the power supply to the electrode 14. Electrical leads 26b and 26c connect from positive output terminals of the power supply to the nozzle 16 and workpiece 20, respectively.

A gas source 27 provides a flow 28 of plasma gas to the plasma arc torch 10. The gas source 27 may comprise a mixture of hydrogen and an inert gas. The percentage of hydrogen in the plasma gas may be in the range of 0% to 35%. The percentage of inert gas in the selected mixture may be in the range of 100% to 65%. The inert gas may be argon.

The flow 28 of a plasma gas from a gas source 27 flows through the torch 18 and is ionized by the pilot arc 12. A larger voltage drop is applied across the electrode and workpiece (lead 26a to lead 26c) than across the electrode and nozzle (lead 26a to lead 26b) in order to induce the arc to transfer to the workpiece once the gas in the electrode workpiece gap is ionized.

The present invention features methods for operating the plasma arc torch 10 for marking and dimpling applications. One method includes forming the plasma gas flow with a selected mixture of hydrogen and an inert gas. The percentage of hydrogen in the selected mixture is in the range of 0% to 35%. The percentage of inert gas in the selected mixture in the range of 100% to 65%. The inert gas may be argon. In a detailed embodiment, the selected mixture may be approximately 5% hydrogen and 95% inert gas.

The method may include adjusting the stand-off distance between the torch and the workpiece based on the percentage of hydrogen in the selected mixture. The stand-off distance may be adjusted in an inverse proportional relationship to the percentage of hydrogen in the selected mixture.

The method may also include adjusting an operating current of the torch based on the percentage of hydrogen in the selected mixture. The operating current may be adjusted in an inverse proportional relationship to the percentage of hydrogen in the selected mixture. The operating current may be adjusted to a value between 4 and 19 amperes depending on the percentage of hydrogen in the selected mixture.

Figure 2:
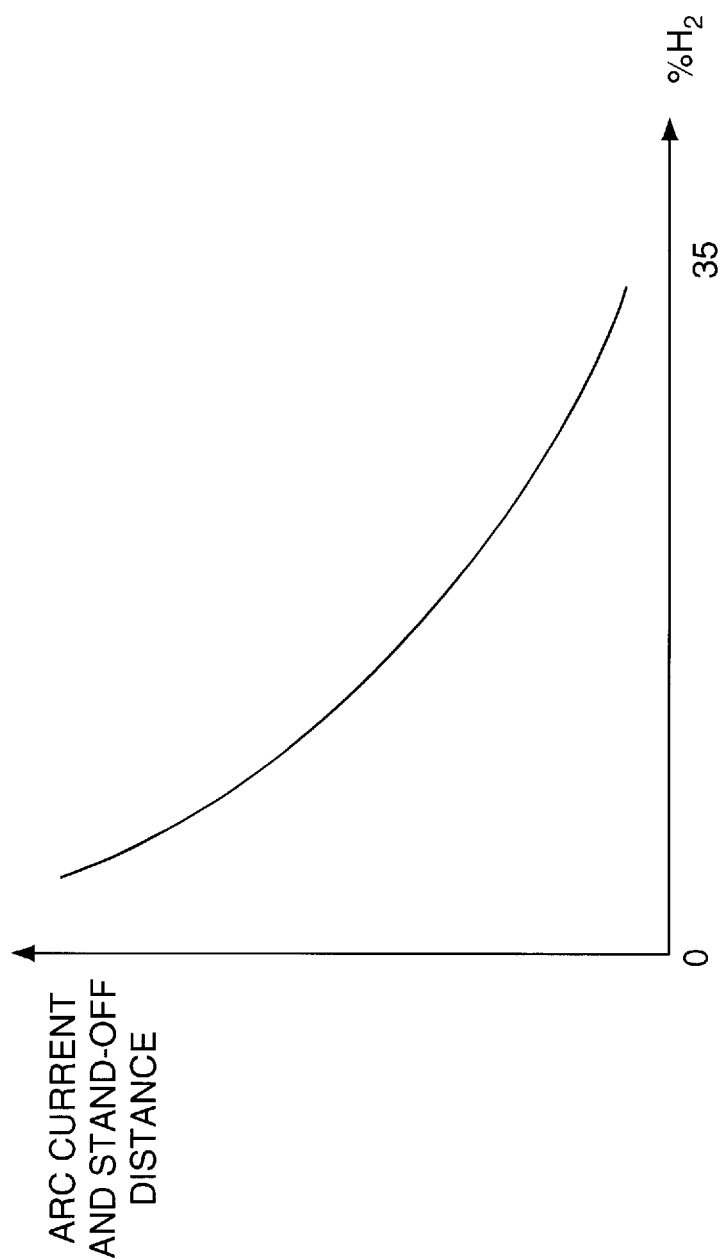
FIG. 2 is a curve illustrating an inverse proportional relationship of stand-off distance or arc current to the percentage of hydrogen in the selected mixture.

FIG. 2 is a curve illustrating the inverse proportional relationship of stand-off distance or arc current to the percentage of hydrogen in the selected mixture. Assuming that all torch operating parameters remain constant as the percentage of hydrogen in the selected mixture is increased, the amount of arc current and the stand-off distance required to make an acceptable mark is reduced. Lower arc current is desirable because it increases the lifetime of the consumable parts. The curve in FIG. 2 is intended to show a general inverse relationship. The invention is not limited to this particular relationship.

Figure 3:
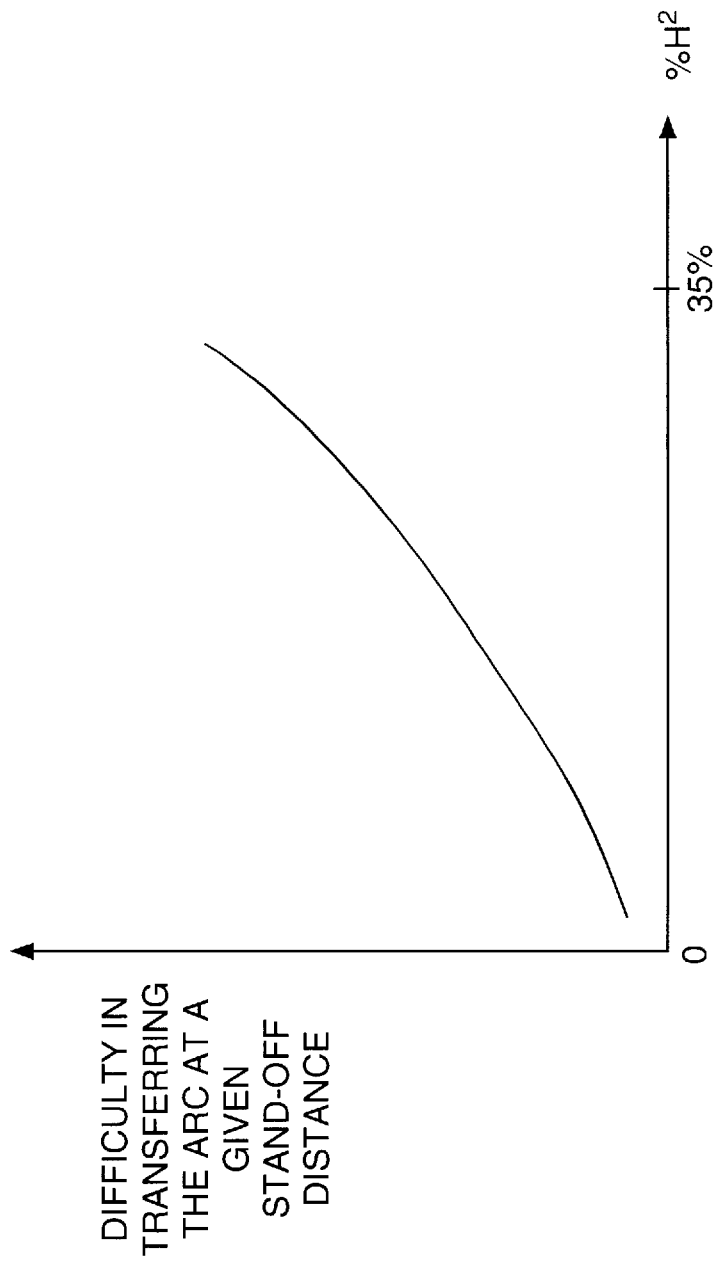
FIG. 3 is a curve illustrating the proportional relationship between the relative difficulty in transferring the arc and the percentage of hydrogen in the selected mixture at a given stand-off distance.

FIG. 3 is a curve illustrating the proportional relationship between the relative difficulty in transferring the arc to the workpiece and the percentage of hydrogen in the selected mixture. Assuming that all torch operating parameters remain constant as the percentage of hydrogen in the selected mixture is increased, it becomes more difficult for the pilot arc to transfer to the workpiece. As the relative difficulty in transferring the arc increases, the stand-off distance must be reduced to achieve the arc transfer. The curve in FIG. 3 is also intended to show a general proportional relationship, as the invention is not limited to one specific proportional relationship.

The present invention also features a method for marking a metallic workpiece with a plasma arc torch spaced a stand-off distance from the workpiece. The method includes forming a plasma gas flow in a plasma arc torch with a selected mixture of hydrogen and an inert gas. The plasma arc torch may be any plasma arc torch such as the one described in connection with FIG. 1.

The percentage of hydrogen in the selected mixture may be in the range of 0% to 35%. The percentage of inert gas in the selected mixture may be in the range of 100% to 65%. The inert gas may be argon. Experiments have shown that a torch utilizing a mixture of approximately 5% hydrogen and 95% inert gas produces high quality marking on mild steel, aluminum and stainless steel workpieces.

The method also includes generating a pilot arc between the electrode and the nozzle by ionizing the plasma gas flow. In addition, the method includes causing transfer of the pilot arc from the nozzle to the workpiece to form a transferred arc between the electrode and the workpiece. Also, the method includes moving the torch relative to the workpiece.

The method may include adjusting the stand-off distance between the torch and the workpiece based on the percentage of hydrogen in the selected mixture. The stand-off distance may be adjusted in an inverse proportional relationship to the percentage of hydrogen in the selected mixture as described in connection with FIG. 2.

In addition, the method may include adjusting an operating current of the torch based on the percentage of hydrogen in the selected mixture. The operating current may be adjusted in an inverse proportional relationship to the percentage of hydrogen in the selected mixture as described in connection with FIG. 2. For example, the operating current may be adjusted to a value between 4 and 19 amperes depending on the percentage of hydrogen in the selected mixture.

The present invention also features a method of operating a plasma arc torch for marking a metallic workpiece spaced a stand-off distance from the torch. The method includes forming a plasma gas flow in a plasma arc torch with a selected mixture of hydrogen and an inert gas. The plasma arc torch may be any plasma arc torch such as the one described in connection with FIG. 1.

The percentage of hydrogen in the selected mixture is in the range of 5% to 20%. The percentage of inert gas in the selected mixture is between is between about 95% and 80%. The inert gas may be argon. The selected mixture may be approximately 5% hydrogen and 95% inert gas.

The method may include adjusting the stand-off distance between the torch and the workpiece based on the percentage of hydrogen in the selected mixture. The stand-off distance may be adjusted in an inverse proportional relationship to the percentage of hydrogen in the selected mixture as described in connection with FIG. 2.

In addition, the method may include adjusting an operating current of the torch based on the percentage of hydrogen in the selected mixture. The operating current may be adjusted in an inverse proportional relationship to the percentage of hydrogen in the selected mixture as described in connection with FIG. 2. For example, the operating current may be adjusted to a value between 4 and 19 amperes depending on the percentage of hydrogen in the selected mixture.

FIG. 4 illustrates an example of operating data of a system for marking mild steel that embodies the invention. These data were taken with an ArcWriter™ Plasma Arc Marking System manufactured by Hypertherm, Inc. The selected mixture was 5% hydrogen and 95% argon. The plasma pressure was approximately 70 PSI (4.8 bar) and the shield pressure was approximately 60 PSI (4.1 bar). The stand-off distance was approximately 0.08 inches (2 mm). The travel speed was varied between 150–250 in/min (3.81–6.35 m/min).

The operating parameters were adjusted for light scoring (<0.001" in depth), heavy scoring (<0.003" depth), and dimpling (0.02" depth) marking applications. For light scoring, the arc voltage was 69 volts and the arc current was varied between 8–10 amps. Utilizing these parameters for light scoring applications resulted in excellent high contrast and long consumable lifetimes.

For heavy scoring, the arc voltage was varied between 66–67 volts and the arc current was varied between 13–15 amps. For dimpling, the arc current was 10 amps. The torch was applied for approximately 400 ms and the resulting dimple was approximately 0.05 inches in diameter.

FIG. 5 illustrates an example of operating data of a system for marking stainless steel that embodies the invention.

These data were taken with the ArcWriter™ Plasma Arc Marking System manufactured by Hypertherm. The selected mixture was 5% hydrogen and 95% argon. The plasma pressure was approximately 70 PSI (4.8 bar) and the shield pressure was approximately 60 PSI (4.1 bar). The stand-off distance was approximately 0.08 inches (2 mm). The travel speed was varied between 150–250 in/min (3.81–6.35 m/min).

The operating parameters were adjusted for light scoring (<0.001" in depth), heavy scoring (<0.005" depth), and dimpling (0.02" depth) marking applications. For light scoring, the arc voltage was varied between 69–72 volts and the arc current was varied between 6–8 amps. Utilizing these parameters for light scoring applications resulted in excellent contrast because of reduced material deformation due to reduced heat input compared with prior art air/air plasma shield gas combination. In addition, utilizing the parameters for light scoring applications resulted in long consumable lifetimes.

For heavy scoring, the arc voltage was varied between 68–69 volts and the arc current was varied between 9–11 amps. For dimpling, the arc current was 8 amps. The torch was applied for approximately 300 ms and the resulting dimple was approximately 0.05 inches in diameter.

FIG. 6 illustrates an example of operating data of a system for marking aluminum that embodies the invention. These data were taken with the ArcWriter™ Plasma Arc Marking System manufactured by Hypertherm. The selected mixture was 5% hydrogen and 95% argon. The plasma pressure was approximately 70 PSI (4.8 bar) and the shield pressure was approximately 60 PSI (4.1 bar). The stand-off distance was approximately 0.08 inches (2 mm). The travel speed was varied between 150 in/min (3.81 m/min).

The operating parameters were adjusted for scoring at approximately <0.001 inch depth. The arc current was 10 amps and the arc voltage was 69 volts. Utilizing these parameters for light scoring applications resulted in excellent edge definition. In addition, utilizing these parameters resulted in long consumable lifetimes.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of operating a plasma arc torch for marking a metallic workpiece spaced a distance therefrom, the torch having a body, an electrode and a nozzle mounted in the body so as to define a plasma chamber, a plasma gas flow through the body that forms a pilot arc in the plasma chamber and a transferred arc between the electrode and the workpiece, the nozzle having a central passage and an exit orifice through which the transferred arc passes to the workpiece, the method comprising:

selecting an amount of hydrogen which is between 0% and 35% of the plasma gas flow and an amount of inert gas which is between 100% and 65% of the plasma gas flow;

forming the plasma gas flow of a selected mixture of hydrogen and inert gas; and selecting at least one of (i) a distance between the torch and the workpiece and (ii) an operating current of the torch based on the amount of hydrogen selected wherein the distance and the operating current are inversely proportional to the amount of hydrogen in the plasma gas flow.

2. The method of claim 1, wherein selecting an operating current of the torch comprises selecting the operating current to a value between 4 and 19 amperes based on the amount of hydrogen in the plasma gas flow.

3. The method of claim 1, wherein selecting an amount of hydrogen comprises selecting the amount of hydrogen which is about 5% of the plasma gas flow and an amount of inert gas which is about 95% of the plasma gas flow.

4. The method of claim 1 wherein the inert gas is argon.

5. A method for marking a metallic workpiece with a plasma arc torch spaced a distance therefrom, the torch having a body, an electrode and a nozzle having a central passage and an exit orifice mounted in the body, and a plasma gas flow passing through the body, the method comprising:

forming the plasma gas flow of a mixture of between 0% and 35% hydrogen and between 100% and 65% inert gas;

generating a pilot arc between the electrode and the nozzle by ionizing the plasma gas flow;

causing transfer of the pilot arc from the nozzle to the workpiece to form a transferred arc between the electrode and the workpiece;

selecting a distance between the torch and the workpiece based on the amount of hydrogen in the plasma gas flow, wherein the distance is inversely proportional to the amount of hydrogen in the plasma gas flow: and moving the torch relative to the workpiece.

6. The method of claim 5 further comprising:

selecting an operating current of the torch based on the amount of hydrogen in the plasma gas flow, wherein the operating current is inversely proportional to the amount of hydrogen in the plasma gas flow.

7. The method of claim 6 further comprising:

selecting an operating current of the torch to a value between 4 and 19 ampere based on the amount of hydrogen in the plasma gas flow.

8. The method of claim 5 further comprising:

forming the plasma gas flow of a mixture of about 5% hydrogen and about 95% inert gas.

9. The method of claim 5 wherein the inert gas is argon.

10. A method of operating a plasma arc torch for cutting or marking a metallic workpiece spaced a distance therefrom, the torch having a body, an electrode and a nozzle mounted in the body so as to define a plasma chamber, a plasma gas flow through the body that forms a pilot arc in the plasma chamber and a transferred arc between the electrode and the workpiece, the nozzle having a central passage and an exit orifice through which the transferred arc passes to the workpiece, the method comprising:

selecting an amount of hydrogen which is between about 5% and 20% of the plasma gas flow and an amount of inert gas which is between about 95% and 80% of the plasma gas flow;

forming the plasma gas flow of a selected mixture of hydrogen and inert gas; and selecting one of (i) a distance between the torch and the workpiece, and (ii) an operating current, based on the amount of hydrogen selected, wherein the distance and the operating current are inversely proportional to the amount of hydrogen in the plasma gas flow.

11. The method of claim 10, wherein
selecting an operating current of the torch comprises selecting the operating current to a value between 4 and 19 amperes based on the percentage of hydrogen in the plasma gas flow.

12. The method of claim 10 further comprising:
selecting the amount of hydrogen which is about 5% of the plasma gas flow and an amount of inert gas which is about 95% of the plasma gas flow.

13. The method of claim 10 wherein the inert gas is argon.

* * * * *